United States Patent [19]
Ishida et al.

[11] Patent Number: 5,483,589
[45] Date of Patent: Jan. 9, 1996

[54] APPARATUS AND METHOD FOR ROUTING CONTROL FOR COMPOSITE NETWORK

[75] Inventors: Kazunori Ishida; Tadao Ishii; Hiroyoshi Mori; Susumu Akizuki; Akihisa Ogino, all of Kawasaki, Japan

[73] Assignee: Fujitsu Limited, Kanagawa, Japan

[21] Appl. No.: 39,623

[22] Filed: Mar. 30, 1993

[30] Foreign Application Priority Data

Mar. 31, 1992 [JP] Japan .................................. 4-077284

[51] Int. Cl.⁶ ........................................... H04M 9/06
[52] U.S. Cl. .................. 379/220; 379/221; 379/225; 379/207; 379/227
[58] Field of Search ................................... 379/220, 221, 379/225, 207, 227, 231

[56] References Cited

U.S. PATENT DOCUMENTS

| | | | |
|---|---|---|---|
| 4,313,036 | 1/1982 | Jabara | 379/225 |
| 4,594,477 | 6/1986 | Noirot | 379/225 |
| 4,661,974 | 4/1987 | Bales et al. | 379/225 |

FOREIGN PATENT DOCUMENTS 239761  2/1990  Japan .

Primary Examiner—Ahmad F. Matar

[57] ABSTRACT

In a routing control apparatus and method for a composite network, a decision is automatically made as to whether a connection to a public telephone network via a leased line is allowed, by examining the dial information entered from a calling party and judging the communications applicable to the receiving node, the type of communication requested, and other factors. A connection judging unit extracts, from the dial information entered by the calling party, a node identifier CC for specifying the receiving node and a connecting type identifier V/F for directing the initiation of judgment as to whether a connection to a public network via a leased line is allowed and for providing a parameter for determining the type of communication requested, and which judges, based on the extracted identifiers CC and V/F, whether a connection to a public telephone network accommodating the called party is allowed via a leased line destined for a receiving node. When it is judged that connection to the public telephone network via a leased line is allowed, the call form the transmitting node is connected via the receiving node to the public telephone network that accommodates the called party.

11 Claims, 11 Drawing Sheets

Fig.2 PRIOR ART

| DESTINATION COUNTRY | DESTINATION TERMINAL | TYPE | TE → PBX1 | PBX1 → PBX2/I-PSTN | PBX2 → PSTN |
|---|---|---|---|---|---|
| NODE 2 U.S.A | PRIVATE NETWORK | ① | 7-XXX-Y..Y | XXX-Y..Y | — |
| | PUBLIC NETWORK | ② | 7-XX0-Z..Z | XX0-Z..Z | Z...Z |
| NODE 3 GERMANY | PRIVATE NETWORK | ① | 7-XXX-Y..Y | XXX-Y..Y | — |
| | PUBLIC NETWORK | ③ | 0-001-49-Z..Z | 001-49-Z..Z | — |
| NODE 4 MALAYSIA | PRIVATE NETWORK | ① | 7-XXX-Y..Y | XXX-Y..Y | — |
| | PUBLIK NETWORK | ③ | 0-001-60-Z..Z | 001-60-Z..Z | — |

Fig.6

| DESTINATION COUNTRY | DESTINATION TERMINAL | TYPE | TE→NODE1 | NODE1→NODE2/1-PSTN | NODE2→PSTN |
|---|---|---|---|---|---|
| NODE 2 U.S.A | PRIVATE NETWORK | ① | 7-11-XXX-Y..Y | 11-XXX-Y..Y | — |
| | PUBLIC NETWORK | ② | 7-11-0/1-Z..Z | 11-0/1-Z..Z [12-9-(1-)Z..Z] | (1-)Z...Z |
| NODE 3 GERMANY | PRIVATE NETWORK | ① | 7-33-XXX-Y..Y | 33-XXX-Y..Y | — |
| | PUBLIC NETWORK FAX | ② | 7-33-0-Z..Z | 33-0-Z..Z [32-9-Z..Z] | Z...Z |
| | PUBLIC NETWORK VOICE | ③ | 7-33-1-Z..Z | 001-49-Z..Z | — |
| NODE 4 MALAYSIA | PRIVATE NETWORK | ① | 7-55-XXX-Y..Y | 55-XXX-Y..Y | — |
| | PUBLIC NETWORK | ② | 7-55-0/1-Z..Z | 001-60-Z..Z | — |

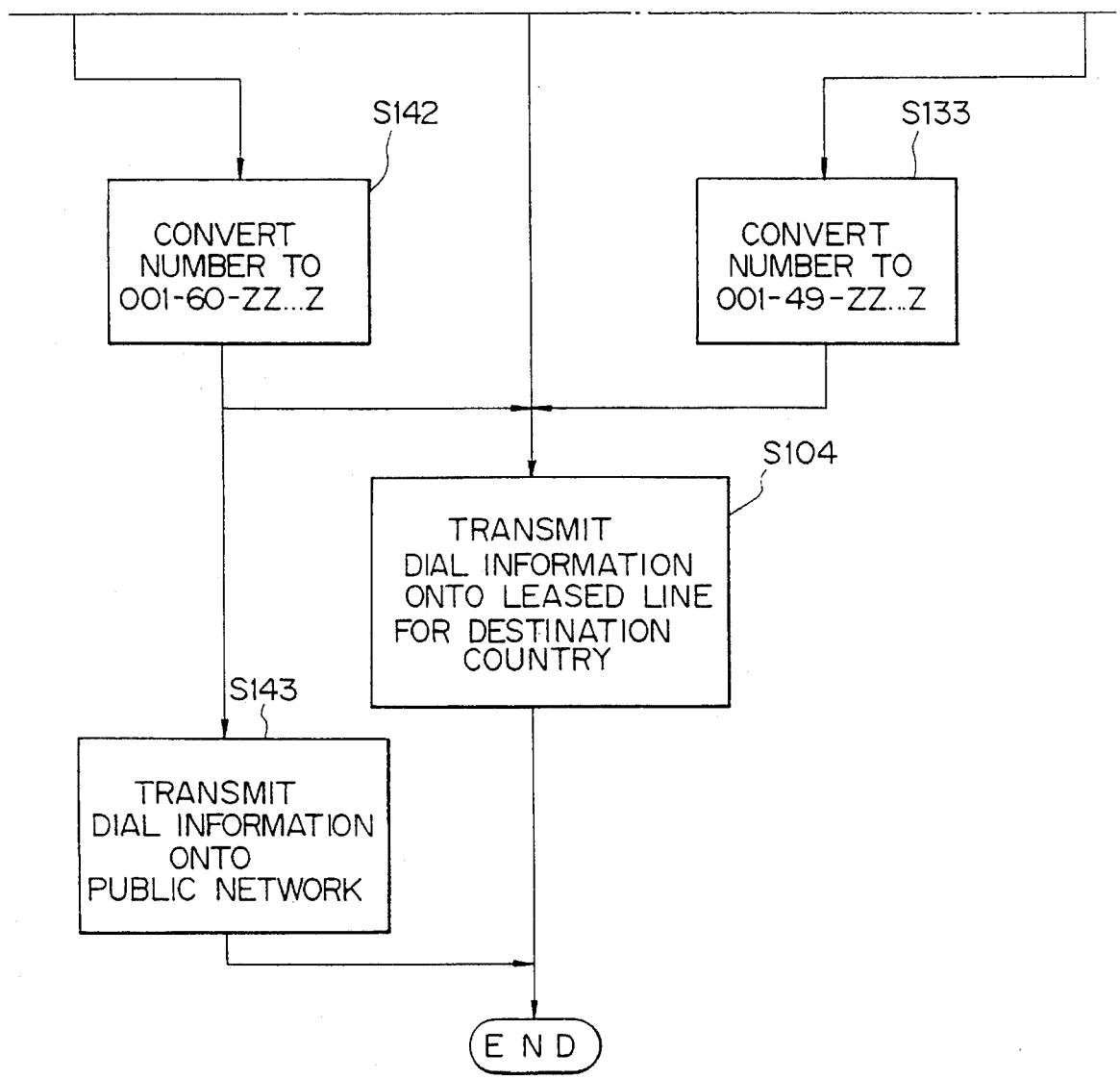

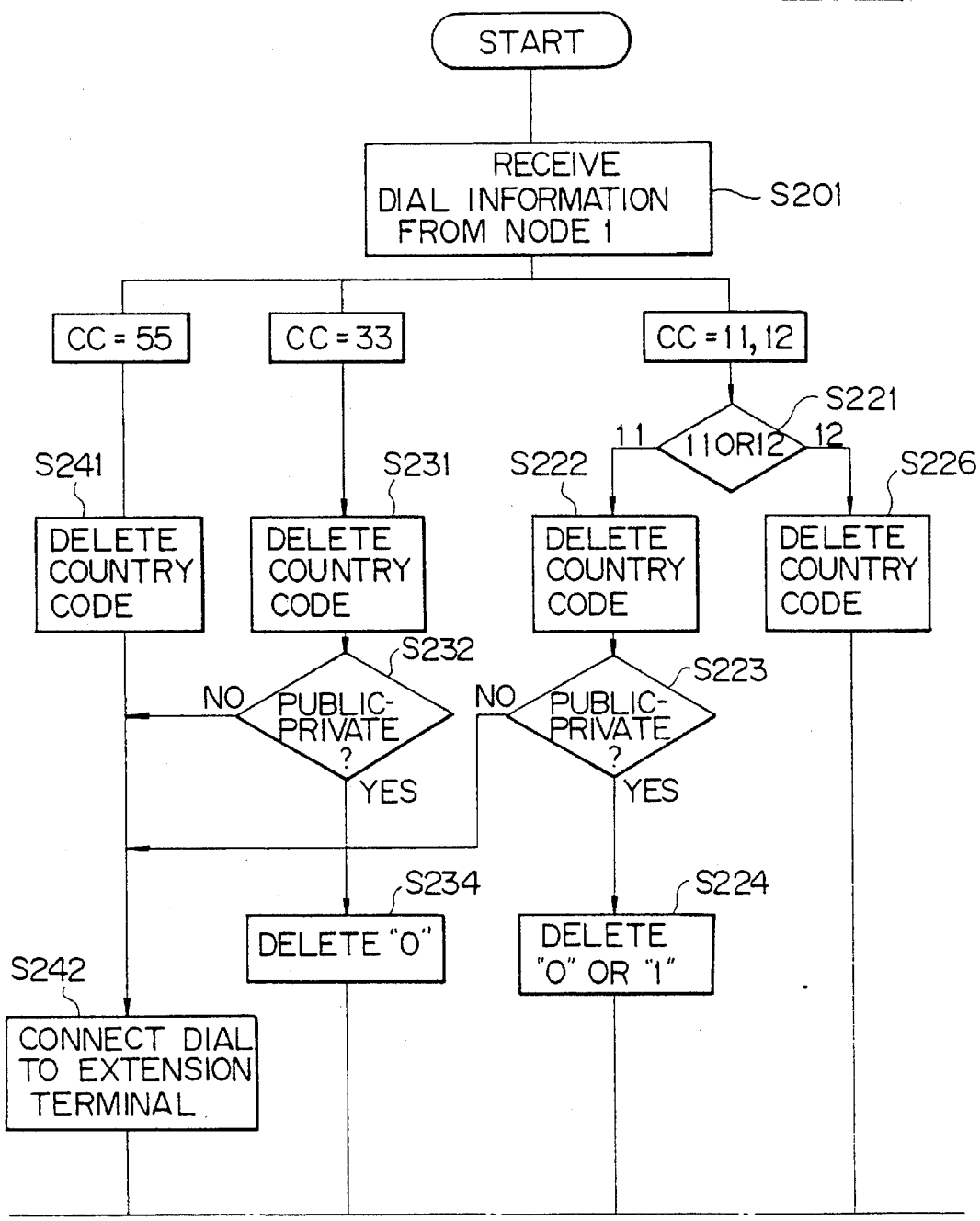

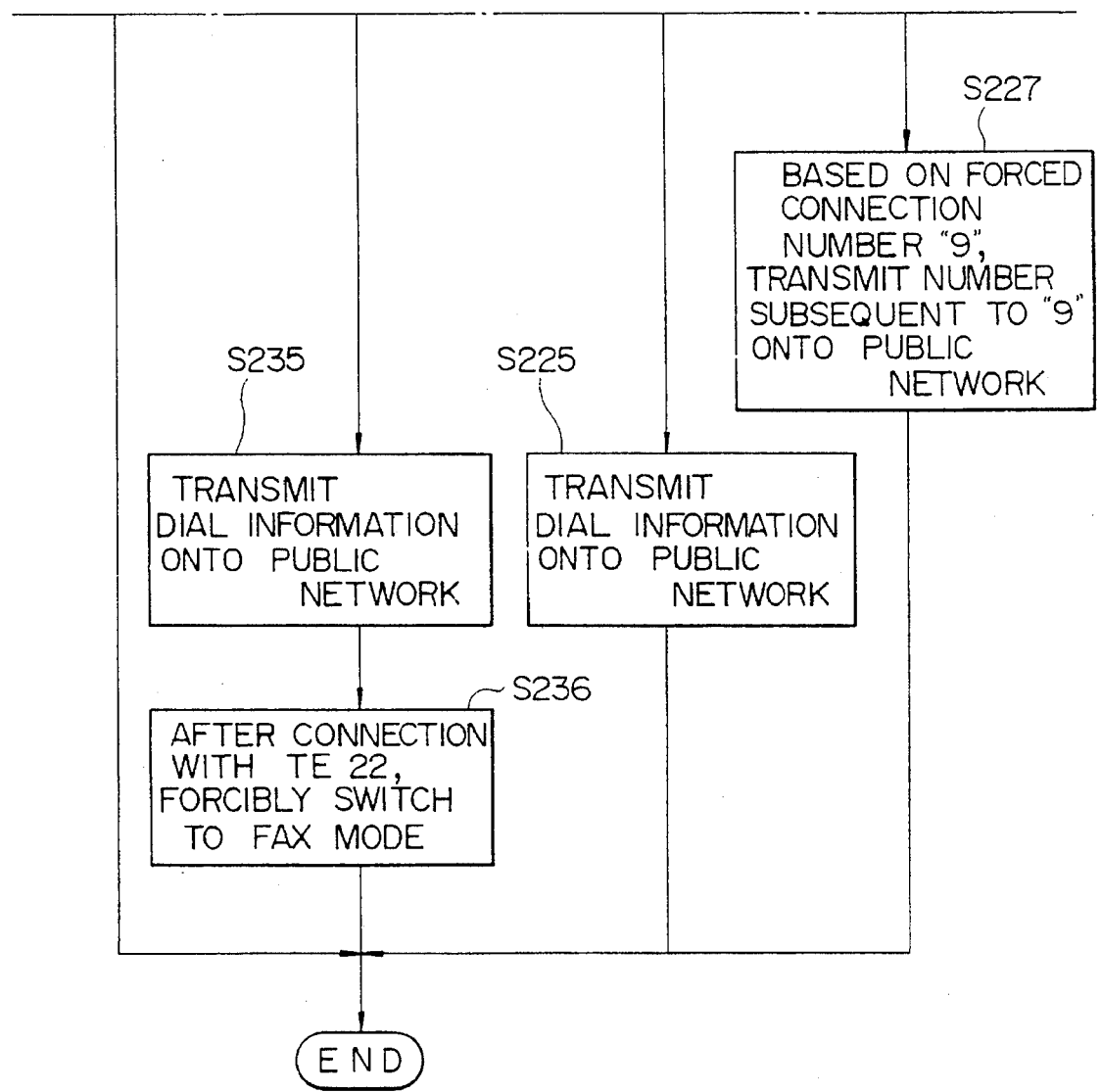

APPARATUS AND METHOD FOR ROUTING CONTROL FOR COMPOSITE NETWORK

BACKGROUND OF THE INVENTION

1. Field of the Invention

The present invention relates to a routing control method for a composite network whereby the most economical communication is achieved for a private network, for example, an international private network (IPNW), interconnecting a plurality of nodes by leased lines and operating in combination with public switched telephone networks (PSTNs).

2. Description of the Related Art

Generally, for economical communications, it is desirable that leased lines that can be hired at fixed rates be used as much as possible rather than public switched telephone networks for which rates are charged by metering. For international communications, however, the legal systems vary from country to country, and whether or not the use of leased lines is allowed depends on the communications regulations in each country. That is, some countries permit connections from leased lines to a public switched telephone network (hereinafter called public-private connections) for communication with a called party connected to that public telephone network, while in others (e.g., Malaysia), such connections are not allowed. Furthermore, even when public-private connections are allowed, some countries (e.g., Germany) allow such connections for facsimile communication only but prohibit connections for voice communication, whereas some countries (e.g., U.S.A.) allow such connections for both voice and facsimile communications. These and other reasons complicate the selection of economical routing.

It is therefore necessary to construct a composite network and design an effective numbering plan for connection between terminals in the network by considering such complicated circumstances as described above.

The numbering plan is usually different for access to a leased line than for access to a public network, which means different number dialing methods, requiring for the calling party to follow different and cumbersome operating procedures.

That is, the calling party has been required, each time, to judge by himself whether public-private connections are allowed, based on the destination country, the type of communication desired, etc., and to enter nonstandardized dial information to set up the optimum route that conforms to the applicable communications regulations.

However, in the prior art, a composite network routing control method has yet to be devised which automatically determines whether or not public-private connections are allowed, by examining the dial information entered from the calling party and judging the regulations on public-private connections applicable to the destination node, the type of communication desired, etc., and which selects the optimum route (the most economical route) under the applicable communications regulations.

Further, for leased lines, compression and multiplexing techniques are often employed to enhance network utilization, which in turn reduces the bandwidth per channel. In particular, when the bandwidth is as narrow as 16 kbps or 8 kbps, if dial information is sent out using the dual-tone multifrequency (DTMF) method that uses dual-frequency tones for transmission of a number, it may become difficult to accurately reconstruct the number at the receiving end. Therefore, in some cases, the number has had to be transmitted by using the pulse dialing method (10/20 PPS method) that depends on transmitting a required number of dial pulses within a prescribed time.

Since the 10/20 PPS method depends on generating a required number of pulses within a prescribed time for transmission of a number, as described above, the time required for transmission of the dial information inevitably increases with an increase in the number of digits contained in the dial information to be transmitted.

In such cases, therefore, and in particular, when the destination node is of the store-and-forward type, the number conversion is performed after all the digits constituting the dial information have been received, and after that, the converted dial information is sent out onto the PSTN. Thus, the time required to transmit dial information has resulted in an appreciable delay from the time the number is dialed by the calling party until the call is connected to the called party.

Accordingly, the prior art routing method for a composite network has had the following problems.

Firstly, the calling party is required, each time, to judge by himself whether public-private connections are allowed, based on the destination country, the type of communication desired, etc., and to enter nonstandardized dial information for connection to the destination via a leased line or a PSTN.

Secondly, in transmitting dial information, and in particular, when the destination node is of the store-and-forward type, the number conversion has to wait until after all the digits constituting the dial information have been received, and after that, the converted dial information is sent out onto the PSTN; thus, the time required to transmit the dial information causes an appreciable delay from the time the number is dialed by the calling party until the call is connected to the called party.

SUMMARY OF THE INVENTION

The present invention has been devised to overcome the above enumerated problems, and its objects are as described below.

A first object of the invention is to provide a routing control method for a composite network wherein a decision is automatically made as to whether public-private connections are allowed or not, by examining the dial information entered from the calling party and judging the regulations on public-private connections in the destination country, the type of communication requested, etc., and the optimum route (the most economical route) is selected under the applicable communications regulations.

A second object of the invention is to provide means for reducing the time required to transmit dial information even when the number of digits contained in the dial information to be transmitted is large.

The above enumerated problems are solved by employing the routing network control method for a composite network that has the following features.

According to the first embodiment, a routing control apparatus for a composite network constructed from a private network containing a plurality of nodes connected by leased lines and public networks connected to the plurality of nodes, comprises: originating dial information that carries an activation identifier (AI) for activating a transmitting node accommodating a calling party, a node identifier (CC)

for specifying a receiving node along a leased line, a connection type identifier (V/F) for directing the initiation of judgment as to whether or not a connection to a public network via a leased line is allowed and for providing a parameter for determining the type of communication requested such as voice or data, and a called party number (Z . . . Z) for designating a called party in a network accommodating the called party; a transmitting node that selects one of available connections based on the node identifier (CC), connection type identifier (V/F), and called party number (Z . . . Z) contained in the originating dial information received in accordance with the activation identifier (AI), the available connections being a connection to a terminal accommodated in the receiving node and a connection to a public network accommodating the called party via the receiving node or via a public line depending on the connection type identifier (V/F), the transmitting node transmitting dial information converted in accordance with the selection; and a receiving node that receives the converted dial information and that makes a connection to the terminal accommodated in the receiving node in accordance with the contents of the dial information or to the public network accommodating the called party in accordance with the connection type identifier (V/F).

Further, according to a second embodiment, the routing control means for a composite network as described above, wherein the transmitting node further comprises forced transmit dial information converting means which, when making a connection to the public network accommodating the called party via the receiving node, decodes part of the originating dial information and converts the dial information into forced transmit dial information consisting of: a forced transmit signal requesting the receiving node for immediate dialing during reception of the originating dial information; and direct dial info,nation capable of being transmitted from the receiving node directly onto the public network accommodating the called party, and transmits the forced transmit dial information to the receiving node, and the receiving node further comprises forced transmit control means for making a connection to the public network accommodating the called party immediately upon receiving the forced transmit signal of the forced transmit dial information and for transmitting the direct dial information that follows the forced transmit signal.

BRIEF DESCRIPTION OF THE DRAWINGS

The present invention will be more clearly understood from the description as set forth below with reference to the accompanying drawings.

FIG. 2 is a number conversion table for explaining a prior art method.

FIG. 6 is a number conversion table for explaining the first embodiment of the invention.

FIGS. 7 (A) and (B) are flowcharts showing an example of a control flow in the transmitting node of the first embodiment.

FIG. 8 is a flowchart showing the positional orientation of FIGS. 8(A) and 8(B).

FIGS. 8(A) and (B) are flowcharts showing an example of a control flow in the receiving node of the first embodiment.

DESCRIPTION OF THE PREFERRED EMBODIMENTS

Figure 1:
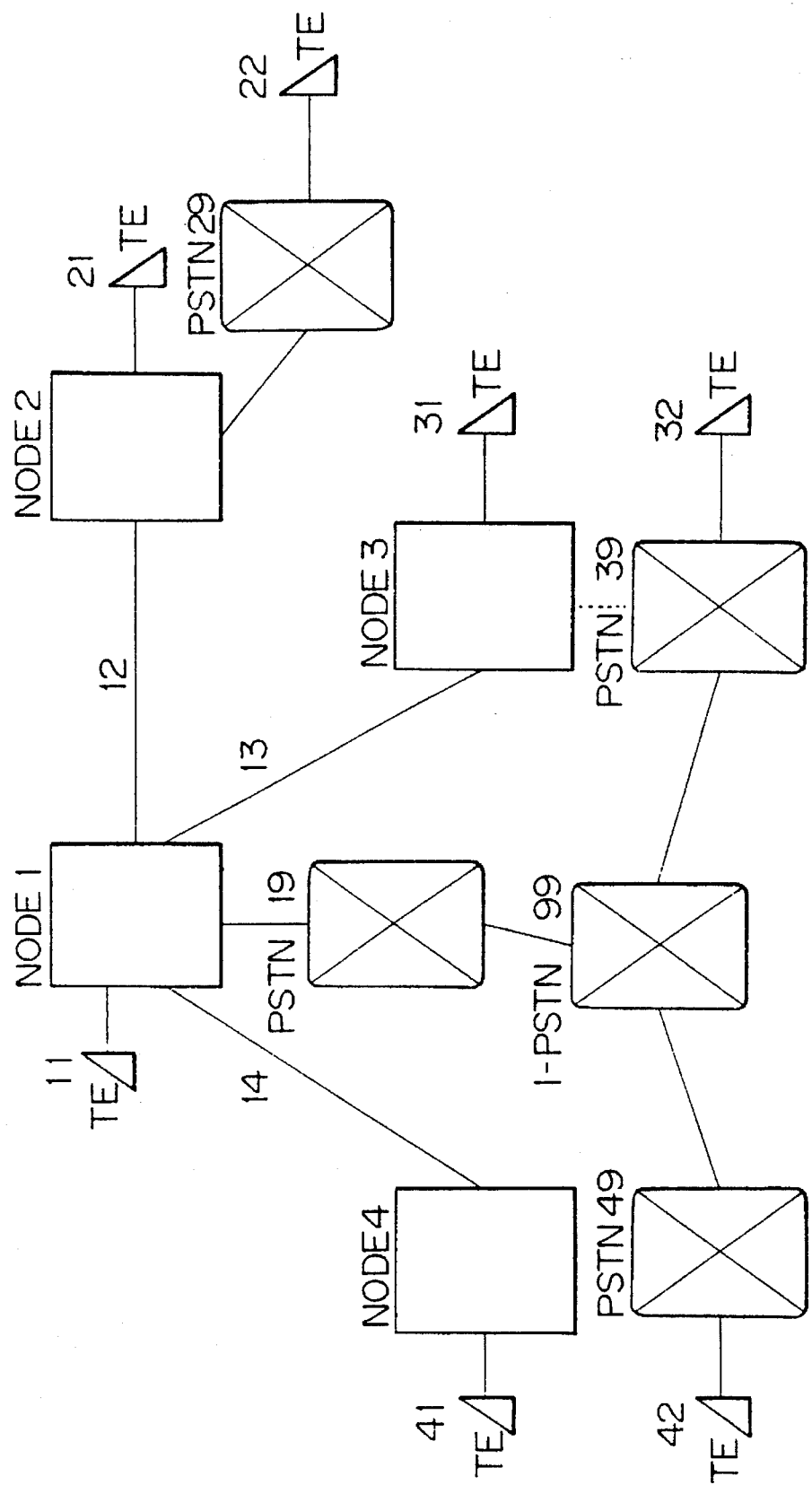
FIG. 1 is a diagram showing a composite network of first and second embodiments.

Before describing preferred embodiments according to the invention, examples of the related art are provided with reference to accompanying drawings (FIG. 1 and FIG. 2).
(1) Optimum routing under communications regulations FIG. 1 is a diagram illustrating an example of a composite network which is an international network. In the figure, the reference numerals 1 to 4 designate nodes 1 to 4 in Japan, U.S.A., Germany, and Malaysia, respectively. The nodes are interconnected by leased lines 12, 13 and 14. The numerals 19, 29, 39 and 49 refer to the public switched telephone networks (PSTNs) in the countries in which the nodes 1 to 4 are installed. Each of the PSTNs 19, 39, 49 is connected to an international public switched telephone network (I-PSTN) 99 so that the PSTNs can be connected with one another. Further, the numerals 11, 21, 31 and 41 are terminals (designated as TE in the figure) accommodated in the nodes 1 to 4, respectively, and the numerals 22, 32 and 42 are terminals (designated as TE in the figure) accommodated in the respective PSTNs.

FIG. 2 shows an example of number conversion in a prior art international network. Taking an international network connecting Japan, U.S.A., Germany, and Malaysia as an example, the number conversion associated with the number dialing and number transmission in a prior art composite network routing method will be described below with reference to FIGS. 1 and 2.

The conventional method has required that the calling party first determine whether public-private connections are allowed before entering the number of the desired called party from his or her terminal.

Furthermore, communications regulations differ from country to country in which the called party exists, for example, in U.S.A., Germany, or in Malaysia, as shown in FIG. 2, and accordingly, the optimum route (the most economical route) to the destination is also different. For example, in selecting the optimum route for connection to the PSTN in Germany, the calling party has previously been required to judge, based on the type of communication desired (voice or facsimile), whether the use of a leased line to the German node is allowed (in the case of facsimile communication) or not allowed (in the case of voice communication).

Furthermore, the numbering plan is usually different for access to a leased line than for access to a public network, which means different number dialing methods, requiring the calling party to follow different and cumbersome operating procedures.

That is, the calling party has been required, each time, to judge whether public-private connections are allowed, based on the destination country, the type of communication desired, etc., and to enter nonstandardized dialing information to set up the optimum route that conforms to the applicable communications regulations.

However, in conventional art, a composite network routing control method has yet to be devised which can automatically determine whether or not public-private connections are allowed, by examining the dial information entered from the calling party and judging the regulations on public-private connections applicable to the destination node, the type of communication desired, etc., and which selects the optimum route (the most economical route) under the applicable communications regulations.

With further reference to FIGS. 1 and 2, specific examples are given below explaining how the dial information for a destination is entered by the calling party and transmitted to the destination (the transmission is hereinafter called the number transmission).

For example, in Malaysia, public-private connections in any form are prohibited, as previously noted, so that communication from the Japan node 1 to the PSTN 49 in Malaysia has to be connected via the I-PSTN regardless of the type of communication. Accordingly, the calling party has to recognize this requirement and perform the so-called toll calling.

Suppose that the calling party is the terminal 11 accommodated in the Japan node 1 and that the destination is the terminal 21 accommodated in the U.S.A. node 2. In this case, the calling party sends dial information, for example, "7-XXX-Y . . . Y", to the node 1, as shown in FIG. 2. The number "7" is the node access number (NA) for calling other nodes 2, 3, 4 via the leased lines 12, 13, 14, and "XXX-Y . . . Y" designates the extension number. The node 1 performs dial transmission to transmit the extension number "XXX-Y . . . Y" to the node 2 via the leased line 12. Upon receiving the extension number "XXX-Y . . . Y", the node 2 performs a procedure (ringing, etc.) for connection to the terminal 21 designated by the extension number. The procedure for connection to a terminal, as described above, is applicable for connection to the terminal 21 in the U.S.A. and the terminal 31 in Germany as well as to the terminal 41 in Malaysia. Description of subsequent communication with the terminal is omitted herein.

Next, a description is given of the case where the called party is the terminal 42 accommodated in the Malaysian PSTN 49. In this case, the calling party in Japan dials "0-001-60-Z . . . Z", for example. The number "0" is the so-called toll calling number for connection to the national PSTN 19, "001" is the number for connection to the I-PSTN 99, "60" is the number for specifying the Malaysia PSTN 49 from the I-PSTN 99, and "Z . . . Z" is the subscriber number for the called party. The node 1 makes a connection to the national PSTN 19 and transmits the dial information "001-60-Z . . . Z". After that, an ordinary connecting procedure is performed for connection to the called party via the I-PSTN 99.

The following description concerns the case where the called party is the terminal 22 accommodated in the U.S. PSTN 29. In the United States, public-private connections are allowed for any type of communication, as previously noted, and therefore, the calling party in Japan dials the public-private connection node number "XX0" for the U.S. node followed by the number of the called party, the dial number being, for example, "7-XX0-Z . . . Z", as shown in FIG. 2. The other numbers in the dial information have the same meanings as those described for connection to Malaysia. The node 1 transmits the dial number "XXX-Z . . . Z" to the node 2 via the leased line 12. Upon receiving this number, the node 2 makes a connection to the PSTN 29, based on the public-private connection node number "XX0", and sends out the subscriber number "Z . . . Z". After that, an ordinary connecting procedure is performed for connection to the called party via the PSTN 29.

A further example will be described below in which the called party is the terminal 32 accommodated in the German PSTN 39. In Germany, public-private connections are allowed for facsimile communication only, as previously noted. The calling party in Japan is therefore required to select (determine) the optimum route that conforms to the communications regulations in force, based on the type of communication desired. For example, when the called party is the terminal 32 accommodated in the German PSTN 39, and when the type of communication is voice communication, the public-private connection is not allowed; therefore, the calling party should dial the number, for example, "0-001-49-Z . . . Z", as shown in FIG. 2. The number "49" is the number for specifying the German PSTN 39 from the I-PSTN 99.

Let us consider the situation in which the called party is the terminal 32 accommodated in the German PSTN 39 and the type of communication is facsimile communication. In this case, since such a public-private connection is allowed, the subscriber number of the called party is entered subsequently to the public-private connection node number "XX0" for the German node, the dial number being, for example, "7-XX0-Z . . . Z". In reality, however, it has been required to dial, for example, "0-001-49-Z . . . Z", as shown in FIG. 2 (routing the call via the I-PSTN). This is because of the problem with the conventional system that when public-private connections are allowed for facsimile communication, it can also allow voice communication on the public-private connection. That is, if the calling party intentionally performed the public-private connection dialing for communication, illegal voice communication would become possible. Therefore, public-private connections to Germany have been totally prohibited to prevent such illegal communication.

As described, in the conventional technique, the calling party has always had to determine and select the optimum route according to the destination country and the type of communication desired and to select the dialing method (for leased line or PSTN) necessary for selection of the optimum route for that particular communication. Furthermore, public-private connections that should be allowed have been prohibited in order to prevent illegal communication, as in the case of facsimile communication to Germany, for example.

(2) LDC (Long Distance Call) connection

The following describes a method for making a connection from the Japan node 1 to the U.S. PSTN 29, for example, for connection to a long distance call line within the U.S. As previously described, when the called party is the terminal 22 accommodated in the U.S. PSTN 29, the calling party dials the public-private connection node number "XX0" for the U.S. node followed by the subscriber number of the called party, for example, "7-XX0-Z . . . Z" as shown in FIG. 2. The first three digits in the 10-digit subscriber number "ZZ . . . Z" constitute the area code, the part of the numbering plan that identifies geographical areas of the United States. If the area specified by the area code is at a distant place from the area of the node 2, "1" may have to be prefixed to "ZZ . . . Z" before transmission onto the PSTN.

In a typical conventional method for LDC connection, the dial information, " . . . ZZ . . . Z", received from the transmitting node 1 is first stored in a memory (not shown) in the receiving node 2 where the area code is interpreted to determine whether the call is for LDC or not; then, if it is for LDC, "1" is prefixed to "ZZ . . . " before transmission onto the PSTN, and if not, the subscriber number "ZZ . . . Z" is directly transmitted onto the PSTN. (Such processing is known as store-and-forward operation.)

However, for leased lines, compression and multiplexing techniques are often employed to enhance network utilization, which in turn reduces the bandwidth per channel. In particular, when the bandwidth is as narrow as 16 kbps or 8 kbps, if dial information is sent out using the dual-tone multifrequency (DTMF) method that uses dual-frequency tones for transmission of a number, it may become difficult to accurately reconstruct the number at the receiving end. Therefore, in some cases, the number has had to be transmitted by using the pulse dialing method (10/20 PPS method) that depends on transmitting a required number of dial pulses within a prescribed time.

Since the 10/20 PPS method depends on generating a required number of pulses within a prescribed time for transmission of a number, as described above, the time required for transmission of the dial information inevitably increases with an increasing number of digits contained in the dial information to be transmitted.

In such cases, therefore, and in particular, when the destination node is of the store-and-forward type, the number conversion is performed after all the digits constituting the dial information have been received, and after that, the converted dial information is sent out onto the PSTN. Thus, the time required to transmit dial information has resulted in an appreciable delay from the time the number is dialed by the calling party until the call is connected to the called party.

Accordingly, the prior art routing method for a composite network has had the following problems.

Firstly, the calling party is required, each time, to judge whether public-private connections are allowed, based on the destination country, the type of communication desired, etc., and to enter nonstandardized dial information for connection to the destination via a leased line or a PSTN.

Secondly, in transmitting dial information, and in particular, when the destination node is of the store-and-forward type, the number conversion has to wait until after all the digits constituting the dial information have been received, and after that, the converted dial information is sent out onto the PSTN; thus, the time required to transmit the dial information causes an appreciable delay from the time the number is dialed by the calling party until the call is connected to the called party.

FIG. 1 is also a diagram showing a composite network suitable for the first and second embodiments. The reference numerals shown in the figure are the same as those described previously.

The above enumerated problems are solved by employing the routing network control method for a composite network that has the following features.

According to the first embodiment, there is provided a routing control apparatus and method for a composite network such as shown in FIG. 1, which is characterized by the provision of connection judging means 100 which receives dial information entered from a calling party, the dial information consisting of an activation identifier AI for activating a transmitting node accommodating the calling party, a node identifier CC for specifying a receiving node, a connection type identifier V/F for directing the initiation of judgment as to whether or not connection to a public network via a leased line is allowed and for providing a parameter for judging the type of communication requested, and a called party number Z . . . Z for designating a called party in a network accommodating the called party, and which extracts the node identifier CC and the connection type identifier V/F from the dial information and judges, based on the extracted identifiers CC and V/F, whether connection to the public network 29, 39, or 49 containing the called party is allowed from the receiving node 2, 3, or 4 via a leased line, wherein when it is judged that the connection to the public network is allowed via the leased line, the call from the transmitting node 1 is connected via the leased line and through the receiving node 2, 3, or 4 to the public network 29, 39, or 49 accommodating the called party.

Further, the second embodiment provides a routing control apparatus and method for a composite network, characterized by the provision of: forced transmit dial information converting means 102 which, when making a connection from the transmitting node 1 through the receiving node 2 to the public network 29 accommodating the called party in accordance with the first embodiment, decodes at the transmitting node 1 part of the dial information received from the calling party and converts the dial information, prior to transmission to the receiving node 2, into forced transmit dial information consisting of a forced transmit signal and direct dial information that can be directly transmitted from the receiving node 2 onto the public network 29 accommodating the called party, and transmits the forced transmit dial information to the receiving node; and forced transmit control means 210 which immediately makes a connection to the public network 29 upon the receiving node 2 receiving the forced transmit signal of the forced transmit dial information, and transmit the forced transmit dial information that follows the forced transmit signal.

Figure 3:
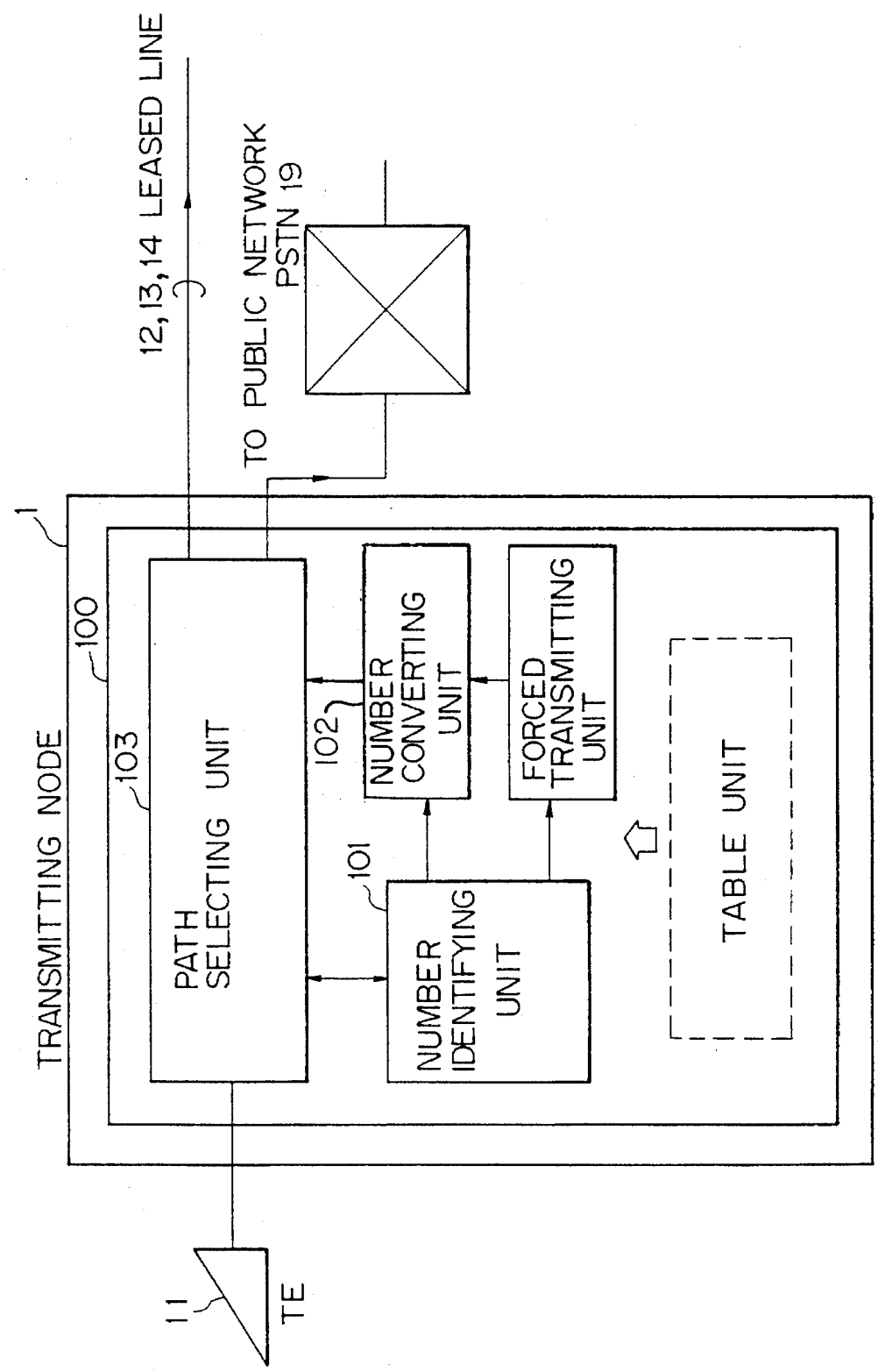
FIG. 3 is a diagram illustrating the working principle of a transmitting node according to the first embodiment.
Figure 4:
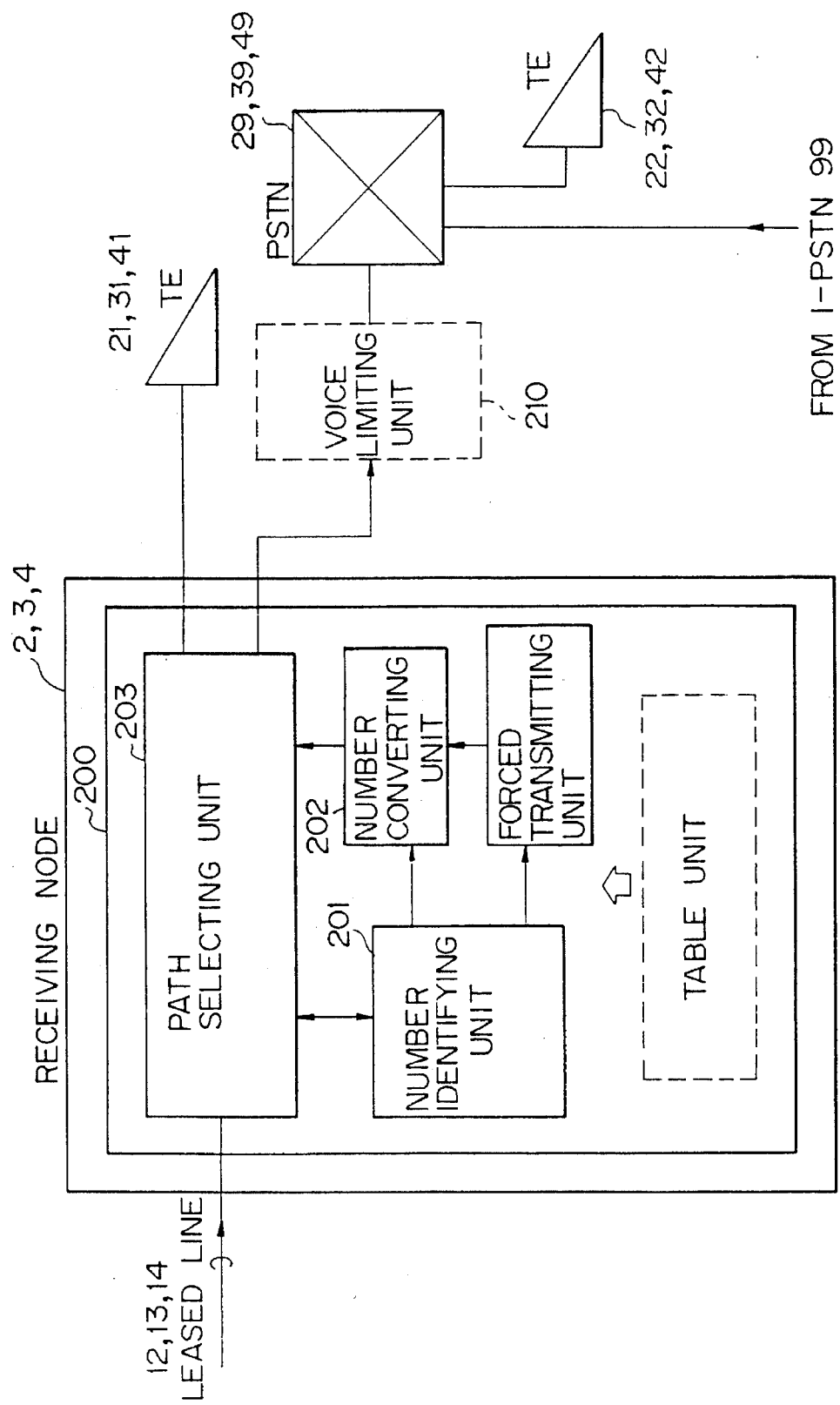
FIG. 4 is a diagram illustrating the working principle of a receiving node according to the first embodiment.

FIG. 3 is a diagram showing a configuration example of the transmitting node 1, and FIG. 4 is a diagram showing a configuration example of the receiving node 2, 3, 4.

In the node 1 shown in FIG. 3, a number identifying unit 101, a number converting unit 102, and a path selecting unit 103 together constitute connection judging means 100. In the node, 2, 3 or 4, shown in FIG. 4, a number identifying unit 201, a number converting unit 202, and a path selecting unit 203 together constitute forced transmit control means 200. The node, 2, 3 or 4, is allowed to connect to the external public telephone network, 29, 39 or 49, via a voice limiting unit 210. Other reference numerals are the same as those shown in FIG. 3, and their explanatory description is omitted herein.

In the composite network shown in FIG. 1, constructing the transmitting node as shown in FIG. 3 and the receiving node as shown in FIG. 4 provides the following virtues.

(1) Automatic selection of optimum routing is made possible

More specifically, the following identifiers are included in the dial information entered from the calling party.

(1) Node identifier for designating the receiving node (2) Connection type identifier for directing the initiation of judgment as to whether public-private connections are allowed or not and for providing a parameter for determining the type of communication requested (e.g., facsimile or voice)

In the transmitting node, the connection judging means 100 extracts the above identifiers, and using the parameters set in (1) and (2), determines whether the public-private connection is allowed or not in accordance with the communications regulations applicable to the designated node.

That is, the optimum route is virtually determined by the type of the destination terminal. When the destination terminal is a terminal directly connected to the receiving node, communication via leased lines is possible regardless of the destination country, and the optimum route is established using the leased lines. On the other hand, when the destination terminal is a terminal accommodated in the public network of the country where the receiving node is installed, the public-private connection is utilized wherever possible under the communications regulations applicable to that node, to select the optimum route.

Therefore, when parameters for selection of optimum routing are included in the dial information, and when choices of optimum routes to be determined by the parameters are stored as set values in the connection judging means 100, the transmitting node can automatically select the optimum route on behalf of the calling party.

Furthermore, each node is provided with voice limiting means 210 which works to disable voice communication when a call is established, for example. This arrangement allows public-private connections for facsimile communication only, such as facsimile communication to Germany via the German public telephone network. When connecting a call via the optimum route as described above, facsimile communication is made possible using the optimum route while preventing illegal voice communication.

(2) Prevention of transmission delay

According to the second invention, the forced transmit dial information converting means 102 in the transmitting node performs the following forced transmit operation in conjunction with the forced transmit control means 200 in the receiving node.

First, at the transmitting node, when the optimum route to the destination is determined by analyzing part of the dial information (e.g., the first few digits), transmission of the dial information to the receiving node is immediately initiated. At this time, if the selected optimum route involves a public-private connection from the receiving node to the public telephone network, a forced transmit signal, hereinafter described, is appended to the dial information, and the number of the called party contained in the dial information is converted to the type of number (called the direct dial information) that can be transmitted directly onto the public telephone network, the converted dial information (called the forced transmit dial information) then being transmitted to the receiving node. The forced transmit number is the number that requests the receiving node to immediately transmit the ensuing forced transmit dial information onto the public telephone network.

Next, at the receiving node, part of the dial information being received (e.g., the first few digits) is analyzed, and when the forced transmit signal is detected, the receiving node immediately makes a connection to the public telephone network to transmit the ensuing dial information received from the transmitting node. As previously noted, the dial information to be transmitted onto the public telephone network is converted at the transmitting node into the type of number that can be directly launched into the public telephone network.

As described above, the receiving node need not wait until after receiving the entire dial information, in the case of a public-private connection, in particular, and transmission of the dial information to the public telephone network can be initiated immediately upon receiving part of the dial information (e.g., the first few digits).

Figure 5:
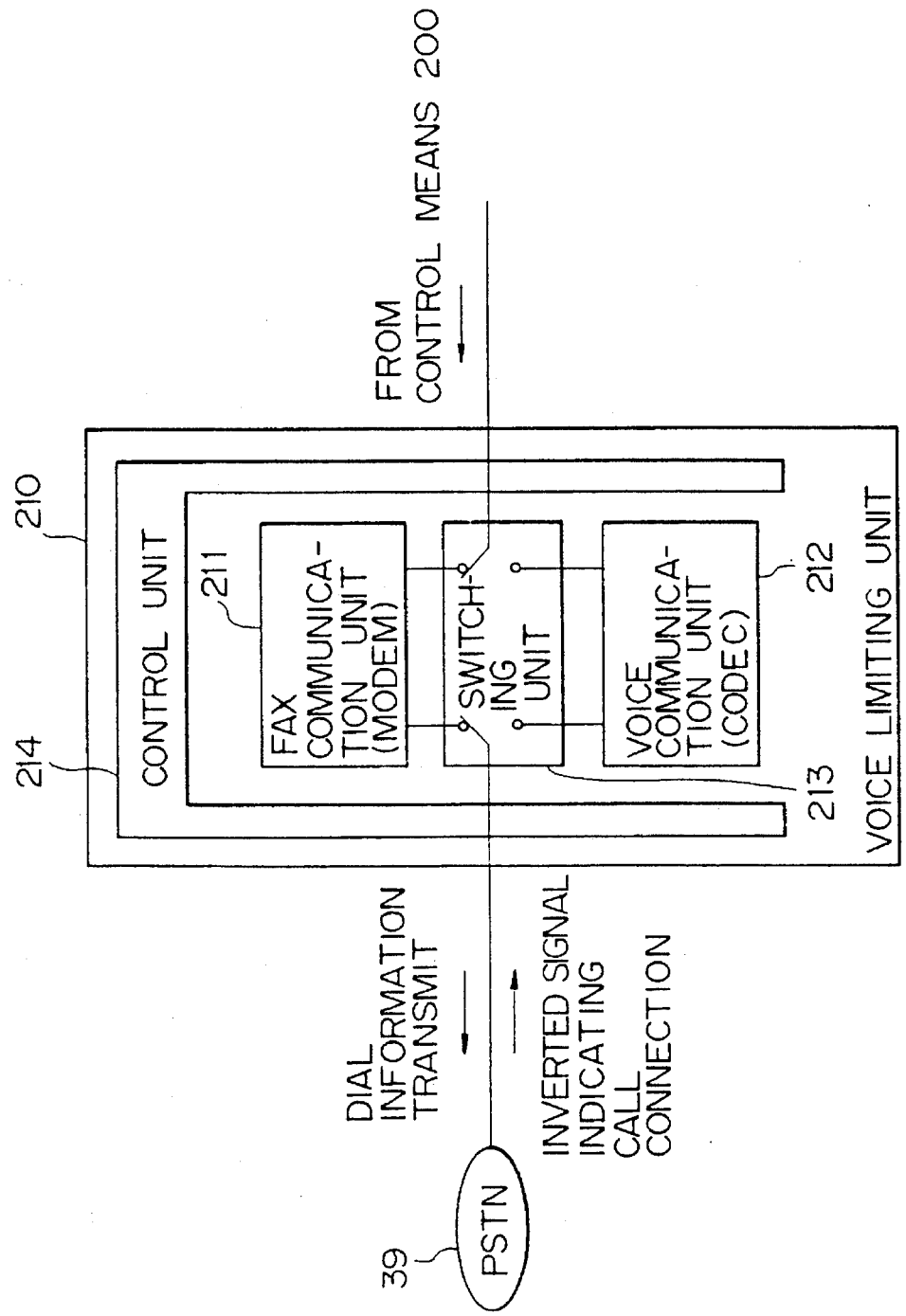
FIG. 5 is a diagram showing a configuration example of a voice limiting section.
Figure 7A:
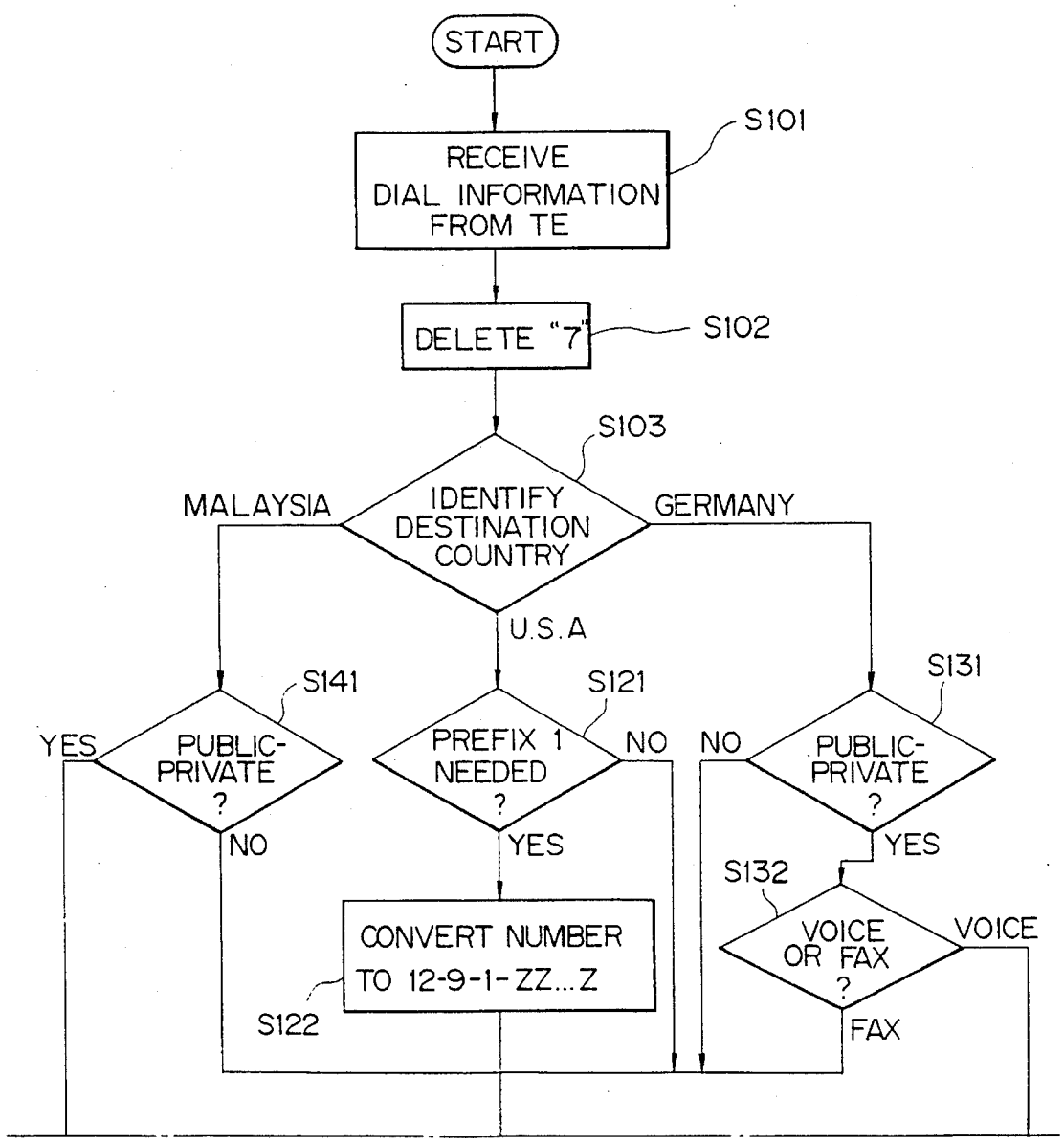
FIG. 7 is a flowchart showing the positional orientation of FIGS. 7(A) and (B).
Figure 9:
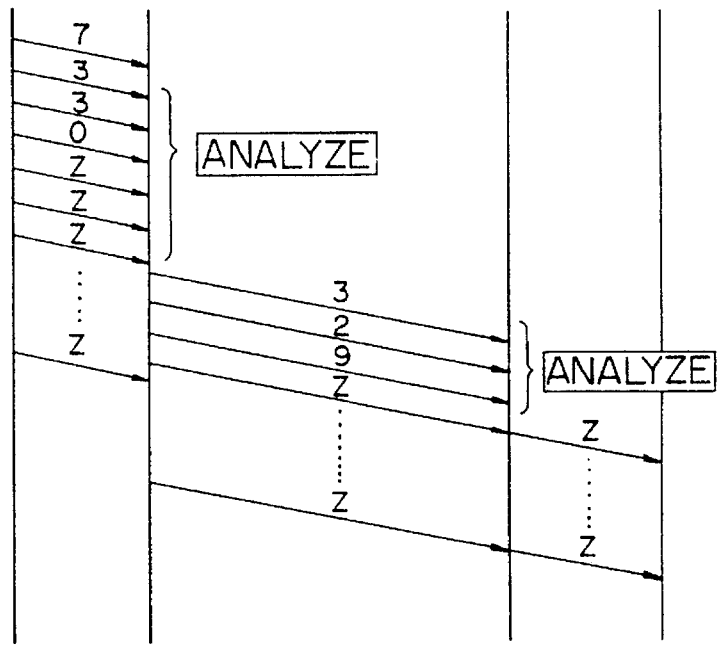
FIG. 9 is a timing chart for explaining an example (1) of dial information transmission according to the second embodiment.
Figure 10:
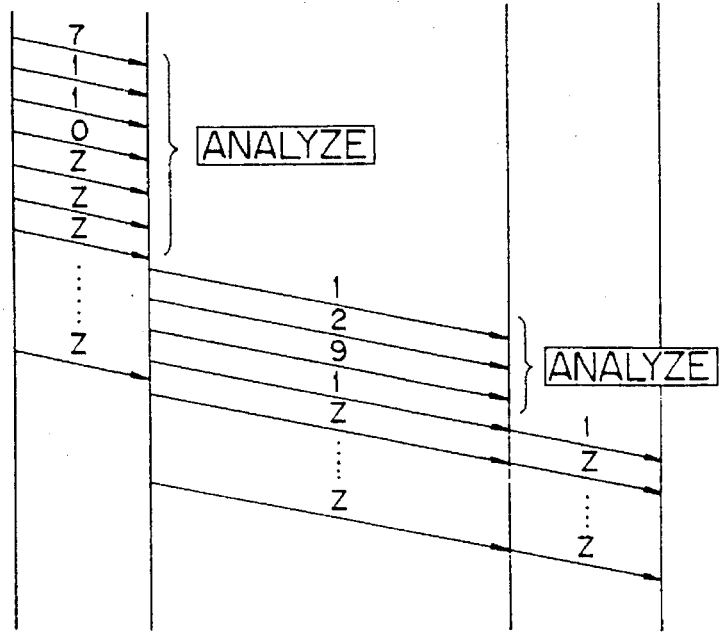
FIG. 10 is a timing chart for explaining an example (2) of dial information transmission according to the second embodiment.

FIG. 5 is a diagram showing a configuration example of the voice limiting unit. FIG. 7 is a flowchart showing an example of a control flow in the transmitting node of the first embodiment, and FIG. 8 is a flowchart showing an example of a control flow in the receiving node of the first embodiment. Further, FIGS. 9 and 10 are timing charts for explaining the flow of the second embodiment.

FIG. 6 shows a number conversion table for explaining the first and second embodiments.

The voice limiting unit shown in FIG. 5 is constructed with a switching control unit 214 which includes a switching unit 213 for switching the line between a FAX communication unit (modem) 211 and a voice communication unit (codec) 212. After transmission of the dial information, the switching control unit 214 detects an inverted signal returned from the public telephone network signifying that the call has been connected, and connects the line to the FAX communication unit 211 during communication and to the voice communication unit 212 at other times, thus physically limiting voice communication.

Referring to FIGS. 1 to 8, excluding FIG. 2, we will now describe in more specific detail one example of the routing control method for a composite network embodying the first and second embodiments.

(1) Automatic connection via optimum routing

In this embodiment, the dial input method is standardized. That is, the numbering plan is structured as shown in FIG. 6.

Types of dial information will first be described. As shown in FIG. 6, there are two types of numbering:

Type (1) "7-CC-XXX-Y ... Y"

Type (2) "7-CC-V/F-Z ... Z"

In the above numbering, "7" is a node access number, "CC" is a node number, and "V/F" is a media number indicating the type of communication (voice/fax).

Numbering of type (1) is used when the called party is a terminal accommodated in a receiving node, while numbering of type (2) is used when the called party is a terminal accommodated in the public telephone network in the country where the receiving node is installed.

Next, we will explain how the optimum route is designated and a connection established from the number entered in accordance with the numbering plan structured as shown in FIG. 6.

In a composite network, for example, in the international network shown in FIG. 1, when a call request is made from the terminal 11 in the node 1 for connection to a terminal selected from among the terminals 21 to 42 connected to the nodes 2 to 4 or the public telephone networks 29, 39, and 49, routing control is performed in accordance with a flow such as shown in FIGS. 7 and 8.

The following explains an example of communication when a call request is made from Japan to Germany in the international network shown in FIG. 1. In this case, the following three types of communication are possible (see the column of "Type" in FIG. 6).

(1) Communication (voice or fax) from Japan (node 1) to Germany (node 3) within the private network (2) Fax communication from Japan (node 1) to Germany (node 3) via the German public telephone network (3) Voice communication from Japan (node 1) to the German public telephone network via the international public telephone network The type of communication requested can be identified by the dial information. In the case of communication of type (1) or (2), the node access number is deleted before transmitting the dial information to the German node 3. In the case of communication of type (3), the number is converted within the node into the type of number that conforms to the numbering plan for the international public telephone network, after which the dial information is transmitted to the I-PSTN 99. The number converting function provided in the nodes (1, 3) enables the caller to dial any desired number in accordance with the same numbering plan regardless of the type of network involved, public or private.

For example, when dial information "7-33-0-Z ... Z" is entered from the terminal 11 in the node 1 (S101 in FIG. 7), first the node access number "7" is deleted (S102), and the receiving node is identified by the node number that follows (S103). Next, the presence or absence of the media number V/F is checked to determine whether the call requires a public-private connection or connection to an extension terminal within the private network (S131). If V/F is present it will be "0" or "1". Based on this data, it is decided that a public-private connection is required; if V/F is "0", the call is for fax communication, and if "1", it is for voice communication. Dial information "33-0-Z . . . Z" is then transmitted to the receiving node 3 (S104).

If the V/f information is not present, instead there will be an area code XXX and extension number Y . . . Y, which together indicate that the call is intended to be received by connection to the receiving node without any public connection (FIG. 6). In the receiving node, when the dial information is received from the node 1 (S201 in FIG. 8), first it is identified whether the dial information is one that is addressed to the receiving node (S231). Next, it is determined whether the call requires a public-private connection, that is, whether the "0" that signifies the public-private connection for fax communication is detected (S232). If detected, the "0" is deleted (S234), and then, "Z . . . Z" is transmitted onto the public telephone network 39 (S235). Thereafter, when the call has been established with the terminal 32 connected to the public telephone network 39, the modem is automatically connected to the line by the action of the voice limiting unit 210 shown in FIG. 5, for example, thus physically disabling voice communication (S236). The voice limiting unit 210 acts to prevent illegal voice communication.

(2) Prevention of transmission delay

FIGS. 9 and 10 are timing charts each explaining an example of dial information transmission according to the second embodiment, FIG. 9 for communication to Germany and FIG. 10 for communication to the United States. A forced transmit control operation according to this embodiment will be described below with reference to FIG. 9.

In the identifying unit 101 shown in FIG. 3, the dial information being transmitted from the terminal 11 is analyzed when, for example, the first four digits (e.g., the node number, media number, etc.) have been received, as previously described. If necessary, further three digits (e.g., the area code used in the public telephone network of the destination country) are interpreted. Thus, before receiving all the numbers transmitted from the terminal 11, the converting unit 102 performs necessary number conversion and then initiates dial information transmission. Any dial information received during the process of analysis or number conversion may be temporarily stored in the node for parallel processing.

In a specific example of number conversion, when part of the dial information, for example, "7-33-0", as shown in FIG. 6, has been received, the "7-33-0" is converted by the number converting unit 102 into a forced transmit number "32-9" which is then transmitted by dialing to the receiving node 3, and the ensuing digits "Z . . . Z" are sequentially transmitted as they are received.

In the identifying unit 201 shown in FIG. 4, the first three-digit part, for example, is analyzed, and if that part indicates the forced transmit number "32-9", the call is immediately connected to the public telephone network 39, and the ensuing digits in the dial information are sequentially transmitted to establish the call.

As described, in both the transmitting node 1 and the receiving node 3, dial information transmission is initiated immediately after receiving at most several digits from the start of the dial information. Therefore, even when the subscriber number "Z . . . Z" is long, or rather, as the number becomes longer, the time required to transmit the dial information becomes shorter in relative terms, as contrasted with the prior art method in which the analysis is started after receiving the entire dial information at each node.

As described above, according to the composite network routing control method of the first embodiment, a decision is automatically made as to whether public-private connections are allowed, by examining the dial information entered from the calling party and judging the regulations on public-private connections applicable to the destination node, the type of communication requested, etc., and the optimum route (the most economical route) is accordingly selected to establish a connection under the applicable communications regulations.

Furthermore, according to the second embodiment, a number transmission method for a composite network is provided wherein means is provided for reducing the time required to transmit dial information even when the dial information contains a large number of digits to be transmitted.

We claim:

1. A routing control apparatus for a composite network including a private network containing a plurality of nodes interconnected by leased lines that can be hired at fixed rates and public networks that are charged by metering, said routing control apparatus operating on originating dial information, input by a calling party, that includes an activation identifier (AI) for activating a transmitting node accommodating a calling party, a node identifier (CC) for specifying a receiving node along a leased line, a connection type identifier (V/F) for directing the initiation of judgment as to whether or not a connection to a public network via a leased line is allowed and for providing a parameter for determining the type of communication requested such as voice or data, and a called party number (Z . . . Z) for designating a called party in a public network accommodating the called party, said routing control apparatus comprising:

a transmitting node that makes a selection of an available connection based on a node identifier (CC), connection type identifier (V/F), and called party number (Z . . . Z) contained in originating dial information received in accordance with the activation identifier (AI) from a calling party, said available connection being a connection to a terminal of said called party accommodated in a receiving node having said identifier CC, and a connection to a public network accommodating a called party having the party number Z . . . Z via the receiving node, or a connection via a public network to the party number Z . . . Z depending on the connection type identifier (V/F), the transmitting node modifying and transmitting dial information which is modified in accordance with the selection; and the receiving node receiving the modified dial information and making a connection to a terminal accommodated in the receiving node in accordance with the contents of the dial information, or making a connection to the public network accommodating the called party in accordance with the connection type identifier (V/F).

2. A routing control apparatus for a composite network according to claim 1, wherein the transmitting node includes originating number identifying means for extracting the node identifier (CC) and the connection type identifier (V/F) from the originating dial information and for determining whether or not a connection to the public network accommodating the called party is allowed via the receiving node when the extracted identifiers indicate that the called party is accommodated in the public network connected to the receiving node; and includes originating number converting means for performing dial number modification for connection to the public network accommodating the called party via the receiving node when the originating number identifying means has determined that the connection via the receiving node is allowed and for performing dial number modification for connection to the public network accommodating the called party via the public line when the originating number identifying means has determined that the connection via the receiving node is not allowed; and further including transmitting path selecting means for selecting, based on the decision made by the originating number identifying means, a path to the public network accommodating the called party via the receiving node or a path to the public network accommodating the called party via the public line in compliance with the connection type identifier (V/F) and for transmitting the corresponding dial information received from the number converting means onto the selected path.

3. A routing control apparatus according to claim 2, wherein the originating number converting means appends a dial number indicating a long distance call when performing dial number modification for connection of a long distance call to the public network accommodating the called party via the receiving node.

4. A routing control apparatus according to claim 2 or 3, wherein the originating number identifying means and the originating number converting means use a prescribed parameter or a conversion table when determining whether the connection to the public network accommodating the called party is allowed via the receiving node or when performing the dial number modification.

5. A routing control apparatus for a composite network according to claim 1, wherein the receiving node comprises: received number identifying means for identifying, based on the modified dial information received from the transmitting node, whether the received number signifies a connection to a terminal accommodated in the receiving node or a connection to the public network accommodating the called party in accordance with the connection type identifier (V/F); received number converting means for performing prescribed dial number modification in accordance with the result of the identification by the received number identifying means; and received path selecting means for selecting, based on the result of the identification by the received number identifying means, a path to the terminal accommodated in the receiving node or a path to the public network accommodating the called party in compliance with the connection type identifier (V/F) and for transmitting the corresponding dial information received from the received number converting means onto the selected path.

6. A routing control apparatus for a composite network according to claim 5, wherein the received number identifying means and the received number converting means use a table for the identification of the connection or for the dial number modification.

7. A routing control apparatus for a composite network according to claim 1, wherein the receiving node further comprises voice blocking means for limiting a voice signal and passing only a data signal received from a data communication device during a period in which a call containing a digital signal is connected to the public network via the leased line in compliance with an instruction of the connection type identifier (V/F).

8. A routing control apparatus for a composite network according to claim 7, wherein the voice blocking means includes: voice communication means having a voice signal encoder-decoder (codec); data communication means having a data signal modulator-demodulator (modem); and switching means having a switch circuit for selecting the data communication means when said call containing said data signal is connected to the public network via the leased line.

9. A routing control apparatus for a composite network according to claim 1, wherein the transmitting node further comprises forced transmit dial information converting means which, when making a connection to the public network accommodating the called party via the receiving node, decodes part of the originating dial information and converts the dial information into forced transmit dial information including: a forced transmit signal requesting the receiving node to provide immediate dialing during reception of the originating dial information; and direct dial information capable of being transmitted from the receiving node directly onto the public network accommodating the called party, and the transmitting node transmits the forced transmit dial information to the receiving node, an d the receiving node further comprises forced transmit control means for making a connection to the public network accommodating the called party immediately upon receiving the forced transmit signal of the forced transmit dial information and for transmitting the direct dial information that follows the forced transmit signal.

10. A routing control method for a composite network constructed from public networks and a private network containing a plurality of nodes interconnected by leased lines, comprising:

a step in which a transmitting node receives originating dial information input by a calling party and transmitted from a user terminal, said dial information including an activation identifier (AI) for activating the transmitting node accommodating the calling party, a node identifier (CC) for specifying a receiving node along a leased line, a connection type identifier (V/F) for directing the initiation of judgment as to whether or not a connection to a public network via a leased line is allowed and for providing a parameter for determining the type of communication requested such as voice or data, and a called party number (Z. . . Z) for designating a called party in a public network accommodating the called party;

a step in which the transmitting node specifies the receiving node by the node identifier (CC) in the originating dial information received in accordance with the activation identifier (AI);

a step in which the transmitting node determines, based on the received connection type identifier (V/F) and called party number (Z...Z), whether a connection is allowed to the public network connected to the specified receiving node and/or whether there is a need to append a dial number indicating a long distance call;

a step in which, when the connection to the public network connected to the receiving node is allowed, the transmitting node then determines whether there is any regulation limiting voice or data communication;

a step in which, when the connection to the public network connected to the receiving node is not allowed in any form, or when the communication to the public network connected to the receiving node is not allowed because of a regulation limiting voice or data communication, the transmitting node converts the originating dial information into dial information for connection via a public network which is connected from the transmitting node to the public network which is connected tot he receiving node, and transmits the converted dial information to the public network connected to the transmitting and receiving nodes;

a step in which, when the connection to the public network connected to the receiving node is allowed, when there is a need to append the dial number indicating a long distance call, or when there is no regulation limiting voice or data communication, the transmitting node converts the originating dial information into corresponding dial information and transmits the converted dial information to the receiving node;

a step in which the receiving node receives the dial information from the transmitting node;

a step in which, in accordance with the dial information, the receiving node makes a connection to a terminal of the called party accommodated in the receiving node, or to the public network accommodating the called party in accordance with the information carried in the connection type identifier (V/F) that directs the initiation of judgment as to whether or not a connection to the public network via the leased line is allowed and for providing a parameter for determining the type of communication requested such as voice or data; and a step in which, when there is any regulation limiting voice or data communication for connection to the public network, the receiving node enables limiting at least during the connection.

11. A routing control method for a composite network according to claim 10, further comprising:

a step in which, when making a connection to the public network accommodating the called party via the receiving node, the transmitting node decodes part of the originating dial information and converts the dial information into forced transmit dial information including of: a forced transmit signal requesting the receiving node for immediate dialing during reception of the originating dial information; and direct dial information capable of being transmitted from the receiving node directly onto the public network accommodating the called party, and transmits the forced transmit dial information to the receiving node; and a step in which the receiving node makes a connection to the public network accommodating the called party immediately upon receiving the forced transmit signal of the forced transmit dial information and transmits the direct dial information that follows the forced transmit signal.

* * * * *